US005627996A

United States Patent [19]
Bauer

[11] Patent Number: 5,627,996
[45] Date of Patent: May 6, 1997

[54] METHOD AND APPARATUS FOR ACCESSING THE SAME COMPUTER FILE USING DIFFERENT FILE NAME FORMATS

[75] Inventor: Eric J. Bauer, Tinton Falls, N.J.

[73] Assignee: AT&T, Middletown, N.J.

[21] Appl. No.: 932,151

[22] Filed: Aug. 19, 1992

[51] Int. Cl.$^6$ .................................................. G06F 17/30
[52] U.S. Cl. .................................... 395/500; 395/601
[58] Field of Search ............................ 395/500, 600, 395/700

[56] References Cited

U.S. PATENT DOCUMENTS

| | | | |
|---|---|---|---|
| 4,641,274 | 2/1987 | Swank | 395/144 |
| 4,792,921 | 12/1988 | Corwin | 395/600 |
| 4,887,204 | 12/1989 | Johnson et al. | 395/600 |
| 4,999,766 | 3/1991 | Peters et al. | 395/600 |
| 5,062,039 | 10/1991 | Brown et al. | 395/650 |

OTHER PUBLICATIONS

"The architecture of Netware 386" Major, Netware Technical Journal, Jul. 1989, vol. 1, No. 3.

"Feasibility of ISO FIAM-based file servers to implement a heterogeneous file system", Marshall et al, Comp. Standard & Interfaces, vol. 14, No. 3, 1992, pp. 191–208.

"The need for coexistence between Apple Macintosh & IBM PC" PC User, issue No. 145, Nov. 17, 90, p. 171.

"Amdahl Unix System Enhancements . . . " Businesswire Oct. 29, 1991.

"Tips for using Word Perfect macros to preserve DG Filenames . . . " DG Review, vol. 12, issue No. 11, May 1992, p. 18.

Y. E. Gail Wang, "Universal–File–Names for Ada," Ada Letters, vol. 10, No. 1, Feb. 1990, pp. 111–117.

D. Comer et al, "The Tilde file naming scheme," IEEE 6th International Conference on Distributed Computing Systems, May 23, 1986, Cambridge, MA, pp. 509–514.

Burton Group Report, vol. 2, Issue 10, Mar., 1992, as background material.

*Primary Examiner*—Parshotam S. Lall
*Assistant Examiner*—Viet Vu
*Attorney, Agent, or Firm*—Samuel H. Dworetsky

[57] ABSTRACT

A computer-based file system enables user access to any of a plurality of previously-stored data files, each file being identified by at least two file names formatted using different file name formats. The system receives a user request including a purported file name having one or more appended segments and a base name, at least one of said appended segments being used to identify the file name format of said base name. The system then checks file names which utilize the identified file name format to locate a data file of the previously-stored data files having a file name which is the same as said base name. According to another feature, data files are identified using one file name format from which the system compiles a file name using the file name format identified in the appended segment. The base name is then compared against the computed file names to locate the desired base name file.

21 Claims, 7 Drawing Sheets

METHOD AND APPARATUS FOR ACCESSING THE SAME COMPUTER FILE USING DIFFERENT FILE NAME FORMATS

CROSS-REFERENCE TO RELATED APPLICATION

Related subject matter is disclosed in my other application filed Jul. 24, 1991, and assigned to the same assignee hereof; U.S. patent application Ser. No. 07/735,393 entitled "Method and Apparatus for Accessing a Computer-Based File system".

TECHNICAL FIELD

The present invention relates to a computer system and, more particularly, to the accessing of a file system thereof.

BACKGROUND OF THE INVENTION

The operating systems of computers require that file names meet certain constraints. A common constraint is to limit the maximum number of characters in a file name. MS-DOS® operating system (MS-DOS is a registered trademark of Microsoft Corporation) limits file names to 11 characters; MACINTOSH® operating system (MACINTOSH is a registered trademark of Apple Computer, Inc.) limits file names to 31 characters; the UNIX® File System (UNIX is a registered trademark of UNIX System Laboratories, Inc.) and the OS/2® High Performance File System (OS/2 is a registered trademark of IBM) limit file names to 255 characters. Another common constraint is to restrict the set of characters that a file name may include, for example, MS-DOS systems prohibit characters such as " " (blank space) from file names, and MACINTOSH systems prohibit ":" (colon characters). MS-DOS systems also constrain file names into a format with eight-character names and three-character extensions, while other file systems permit any file name structure.

It would be desirable if users of operating systems having restrictive file naming formats were capable of accessing files created and named by other operating systems in such a way as to permit files to be shared among different operating systems. It is clearly very easy to enable operating systems having less-restrictive file naming formats to access files created by operating systems having more-restrictive file naming formats. The difficulty lies in providing access to less restrictively-named files from operating systems having more restrictive file naming formats. Since some operating systems like MS-DOS have much more restrictive file names than other operating systems, e.g., MACINTOSH and UNIX, it is possible to create and name files in less restrictive operating systems with names that are illegal in more restrictive operating systems. For example, one can create a file called "meeting agenda" on either a MACINTOSH or a UNIX file system, however this file name is illegal on MS-DOS systems because it is too long (14 characters), does not meet the 8-character-file name/3-character-extension format, and includes an illegal character (a blank space).

SUMMARY OF THE INVENTION

One solution to this problem is to create short, more restrictive MS-DOS file names that are aliases for the longer, less restrictive names that MACINTOSH and UNIX users may have created. For example, a MACINTOSH file "meeting agenda" might be accessible to MS-DOS systems via the file name alias "meeting.age". The difficulty with this solution is that one does not want these shorter aliases to pollute the space of file names that MACINTOSH, UNIX and other less-restrictive operating system users see. When listing the contents of directories, client users only want to see one valid file name per file. For example, MACINTOSH users want to see "meeting agenda", not both "meeting agenda", "meeting.age" and other aliases for other client operating systems.

In accordance with the present invention, I have solved the above-described problems by enabling a user program file access request to identify the file name format to be used for purported file names entered by the user. In one arrangement, a file name format is identified using a prepended segment, "dos=" for example, followed by a base name which is the MS-DOS alias, e.g., "meeting.age", to permit an MS-DOS file server, running on a less-file name-restrictive operating system, to offer MS-DOS clients convenient access to the file named "meeting agenda." A client computer user of a file system incorporating this invention could receive the names of file name aliases from a file server application program (which is a user program). The file server application makes a system call with the prepended segment "dos=" and base name "." (e.g., "dos=.") or via a custom operating system call. The system would respond with only the MS-DOS file name aliases, e.g., "meeting.age". The client computer user would then be able to access the file named "meeting agenda" from a more restrictive operating system, e.g., MS-DOS. The user may then access the file as "dos=meeting.age" in the conventional manner. Since the intended use for this invention is with a file server application, it is expected that the client computer user working from an MS-DOS computer would enter "meeting.age" and the file server application would prepend "dos=" thus producing the file name "dos=meeting.age" which is passed to the file system. Thus, in accordance with the present invention, a computer-based file system enables access to any of a plurality of previously-stored data files stored in a storing means, each file being identified by a default, or standard, file name and one or more alternate name formats. The system receives a user program request including a purported file name having zero or more appended segments and a base name; the presence of one or more appended segment signals that one of the alternate name formats should be used, while the absence of an appended segment (or one explicitly identifying the standard file name) signals that the standard name format should be used. The system then accesses the storage device and checks file names therein which utilize the identified file name format to locate a data file having a file name which is the same as said base name.

According to another feature of the present invention, data files may be identified using one file name format, from which the system compiles a file name using the file name format identified in the appended segment. The base name is then compared against the computed file name to locate the desired base name file.

HIGH LEVEL DESCRIPTION

In the following description, each item or block of each figure has a reference designation associated therewith, the first number of which refers to the figure in which that item is first located (e.g., 110 is located in FIG. 1 and step 439 is located in FIG. 4).

Figure 1:
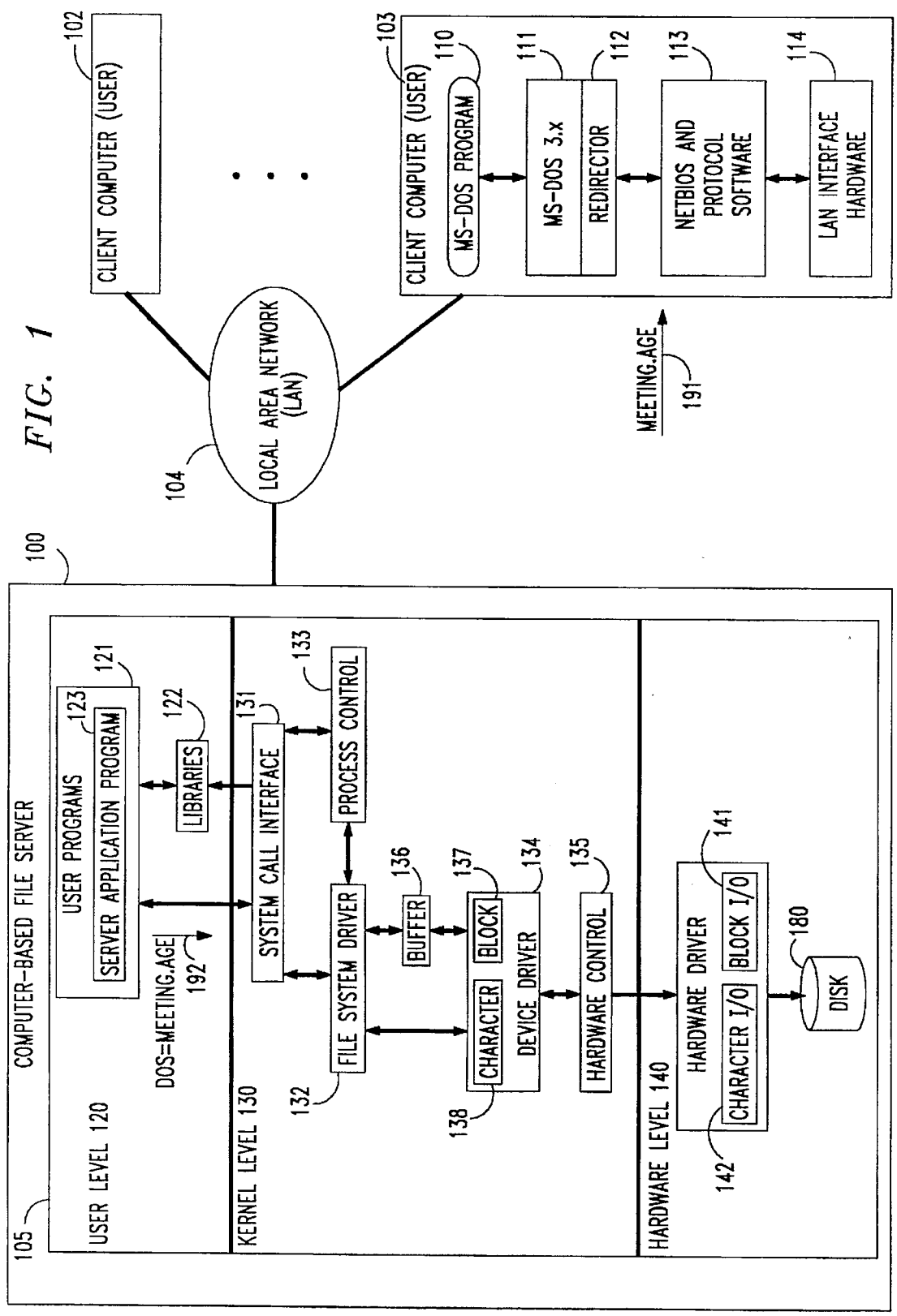
FIG. 1 is a block diagram of a client/server network including a server computer in which the present invention may be utilized.

Shown in FIG. 1 is a block diagram of an illustrative client/server system or network in which the present invention may be utilized. The network includes a server computer 100 connected to a plurality of client workstations or computers 102, 103 via a local area network (LAN) 104. Server computer 100, illustratively, provides the client computers 102, 103 shared access to data stored on hard disk 180.

In one illustrative arrangement, each of the one or more client computers 102, 103 may be a personal computer (PC) which operates using the well-known MS-DOS operating system or OS/2 operating system. The LAN 104 may, illustratively, be the AT&T STARLAN system. The server computer 100 may, illustratively, be an AT&T 6386 Work-Group System computer running on UNIX System V Release 4.0 operating system. The client PCs 102, 103 and server computer 100 may use the AT&T StarGROUP® system software. This StarGROUP system software allows MS-DOS and OS/2 client PCs to transparently share data files on a LAN.

The server computer 100 running the server program 123 on top of the UNIX operating system 120 can support one or more large hard disks (e.g., 180) that can be made available to client PCs 102 and 103 on the LAN 104. There may be a separate server program 123 for each purported operating system type (e.g., one for MS-DOS, one for UNIX, etc.).

Software on the client computer 103 interacts with the server program 123 on the server computer 100 to allow access to disk 180 by client program 110. Specifically, system calls referencing disk 180 are packaged into request messages by the redirector 112 and transmitted to the server program 123 by the network software 113 (known in the art as netbios and protocol software) over the local area network 104. The server program 123 processes the request and sends a response to the client computer 103.

A more detailed description of the operating aspects of the client/server interaction is described in the article entitled "DOS Server Program for UNIX Computers" by I. J. Heizer, published in *AT&T Technology*, Volume 4, Number One, 1989.

Server computer 100, hereinafter referred to as the computer-based file server, operates under control of a UNIX operating system 105, shown using a high-level architecture layer diagram. The layer diagram includes a user level 120, a kernel level 130, and a hardware level 140. The user level 120 interfaces to clients (hereinafter users) 102, 103 via LAN 104 enabling access to the desired file stored in disk 180.

The user level 120 includes user programs 121 (such as the server program) and libraries 122. The hardware level 140 provides the operating system 110 with basic services needed by computer 100. The kernel level 130 interacts directly with the hardware level 140 providing common services to user level 120 programs and insulating them from hardware idiosyncrasies. Viewing the system as a set of layers, the operating system is commonly called the system kernel 130, or just the kernel, emphasizing its isolation from user programs. Because user programs are independent of the underlying hardware, it is easy to move them between UNIX systems running on different hardware. The general description of the well-known operation of a UNIX operating system is derived from Chapter 2 of the book entitled "The Design of the UNIX Operating System" by Maurice J. Bach.

The system call interface 131 represents the border between user level 120 (user programs 121 and program libraries 122) and the kernel level 130. System call interface 131 converts user program calls into UNIX system calls. System calls look like ordinary function calls in C programs, and libraries map these function calls to the primitives needed to enter the operating system in a well-known manner. The set of system calls includes those that interact with the file system driver 132 and those that interact with the process control subsystems 133. The file system driver 132 manages files, allocating file space, controlling access to files, and retrieving data for users. Processes interact with the file system driver 132 via a specific set of system calls, such as open (to open a file for reading or writing), close, read, write, stat (query the attributes of a file), chown (change the record of who owns the file) and chmod (change the access permissions of a file). The file system driver 132 accesses file data using a buffer 136 that regulates data flow between the kernel and secondary storage devices. The buffering mechanism interacts with block I/O device drivers 137 to initiate data transfer to and from the kernel. Device drivers 134 are the kernel modules that control the operation of peripheral devices. Block I/O devices 141 are random access storage devices; alternatively, their device drivers 137 make them appear to be random access storage devices to the rest of the system. For example, a tape driver may allow the kernel to treat a tape unit as a random access storage device. The file system also interacts directly with "raw" or character I/O device drivers 138 without the intervention of a buffering mechanism. Raw devices, sometimes called character I/O devices 142, include all devices that are not block devices.

The process control subsystem 133 is responsible for process synchronization, interprocess communication, memory management, and process scheduling. The file system driver 132 and the process control subsystem 133 interact when loading a file into memory for execution. The process control subsystem 133 reads executable files into memory before executing them.

Some of the system calls for controlling processes include the following: fork (create a new process), exec (overlay the image of a program onto the running process), exit (finish executing a process), wait (synchronize process execution with the exit of a previously forked process), brk (control the size of memory allocated to a process), and signal (control process response to extraordinary events).

Figure 2:
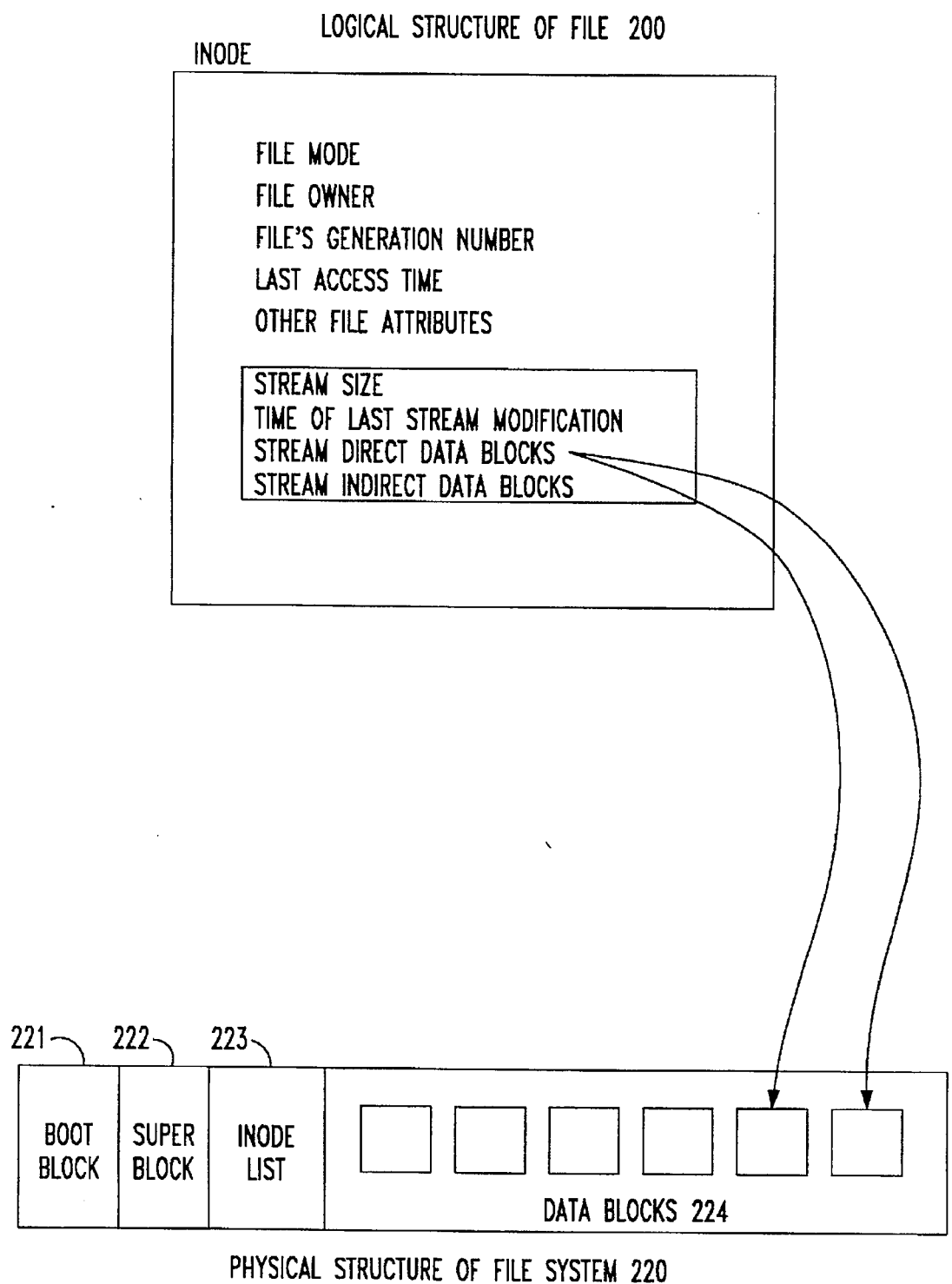
FIG. 2 shows a logical and physical structure of a file and a file system.
Figure 3:
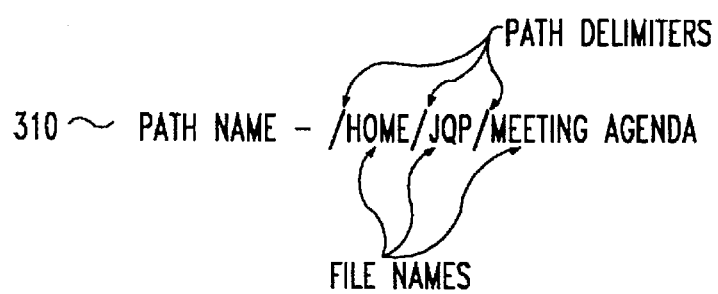
FIG. 3 defines various terms useful in describing the present invention.
Figure 3:
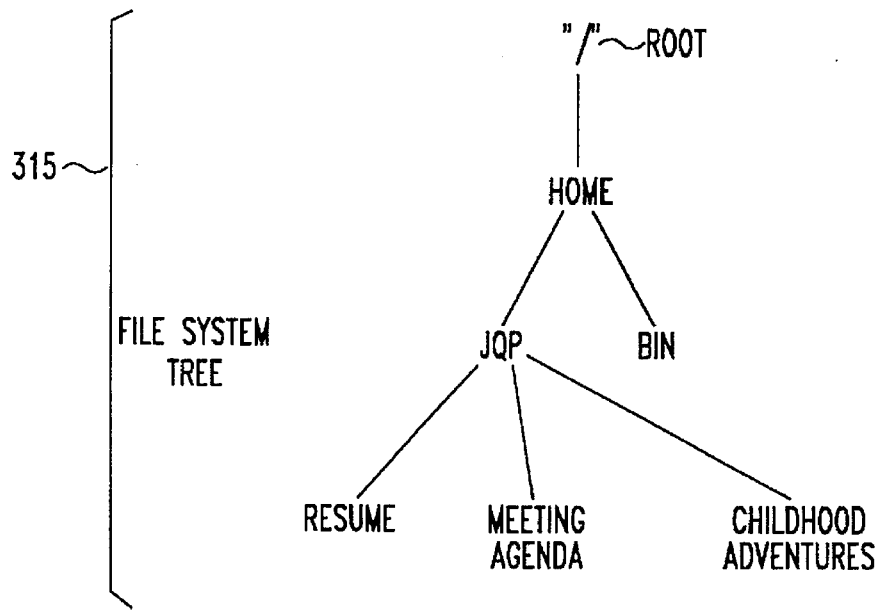

With joint reference to FIGS. 1, 2 and 3 we describe an overview of a file system. Every file is named by one or more path names, 310. A path name, as shown in 310, includes file names (e.g., home) separated by delimiters (/). The internal representation of a file is given by an inode, 200, which contains a description of the disk layout of the file data and other information such as the file owner, access permissions, and access times. The term "inode" is a contraction of the term index node and is commonly used in literature on the UNIX system. Every file has one inode, but it may have several path names, all of which map into the inode. Each path name is called a link. When a process refers to a file by path name, the kernel parses the path name one file name component at a time, checks that the process has permission to search the directories in the path, and eventually retrieves the inode for the file. For example, if a process makes the call "open (/home/jqp)" the kernel retrieves the inode for "/home/jqp". As shown by 315 a "file system tree" for a full path name starts with a slash character ("/") and specifies that the path name is relative to the "root" of the file system tree. Following the branches that lead to successive component names of the path name "/home/jqp/meeting agenda" designates a full path name while "/jqp/meeting agenda" does not. A path name does not have to start from root but can be designated relative to the "current directory" of an executing process by omitting the initial slash in the path name. Thus, starting from current directory "/home", the path name "bin" designates the file whose full path name is "/home/bin".

When a process creates a new file, the file system driver 132 assigns it an unused inode. Inodes are stored in a section 223 of the physical file system 220, as will be described shortly, but the file system driver 132 reads them into an in-core-memory inode table when manipulating files. The UNIX system typically keeps regular files and directories on block devices such as disks. An installation may have several physical disk units each containing one or more file systems. A file system 220 is organized as a sequence of logical blocks, each block containing 512, 1024, 2048, or any convenient multiple of 512 bytes, depending on the system implementation. Multiples of 512 are used by convention and there is no intrinsic reason to use 512 byte blocks.

A physical file system may have the physical structure illustrated by 220 of FIG. 2. The boot block 221 (only on some file systems) occupies the beginning of a file system, typically the first disk sector, and may contain the bootstrap code that is read into the machine to boot, or initialize the operating system. Although only one boot block 221 is needed to boot the system, every file system may have a (possibly empty) boot block. The super block 222 describes the state of a file system—how large it is, how many files it can store, where to find free space on the file system, and other information. The inode list 223 is a list of inodes that follows the super block in the file system. Administrators specify the size of the inode list 223 when configuring a file system. The file system driver 132 references inodes by index into the inode list 223. One inode is the root inode of the file system: it is the inode by which the root directory structure of the file system is accessible after execution of the mount system call. The data blocks 224 start at the end of the inode list and hold the contents of file data. An allocated data block contains the actual data of a file and can belong to one and only one file in the file system.

The operation of the present invention will be described as utilized in an Enhanced File System (EFS) implemented on a UNIX system using a virtual file system. Some UNIX systems use a Virtual File System (VFS) concept to organize all file system operations. Although the present invention does not require a VFS mechanism, VFS provides a convenient conceptual model to explain the invention. VFS is a merge of the System V File System Switch (FSS) and the SUN OS VFS mechanism. (SUN OS is a trademark of Sun Microsystems). It is important to note that user programs will be unaffected by the SVR4.0 VFS architecture.

VFS provides a file-system-type independent interface to programs and users while allowing each particular file system to process file system operations in their own manner. File system type dependent kernel routines do the work specific to the type.

A key strength of VFS is that it allows new file system types to be defined and implemented by third-party software houses. The set of kernel interfaces that constitute VFS are available in a VFS file system type writers' guide available from UNIX System Laboratories, Inc.

General Description

The present invention permits a programmatic or human user of the file system (hereinafter collectively referred to as a user) to access files using aliases or alternate names that may be different from the standard file name of the file stored in the directory structure.

Figure 7:
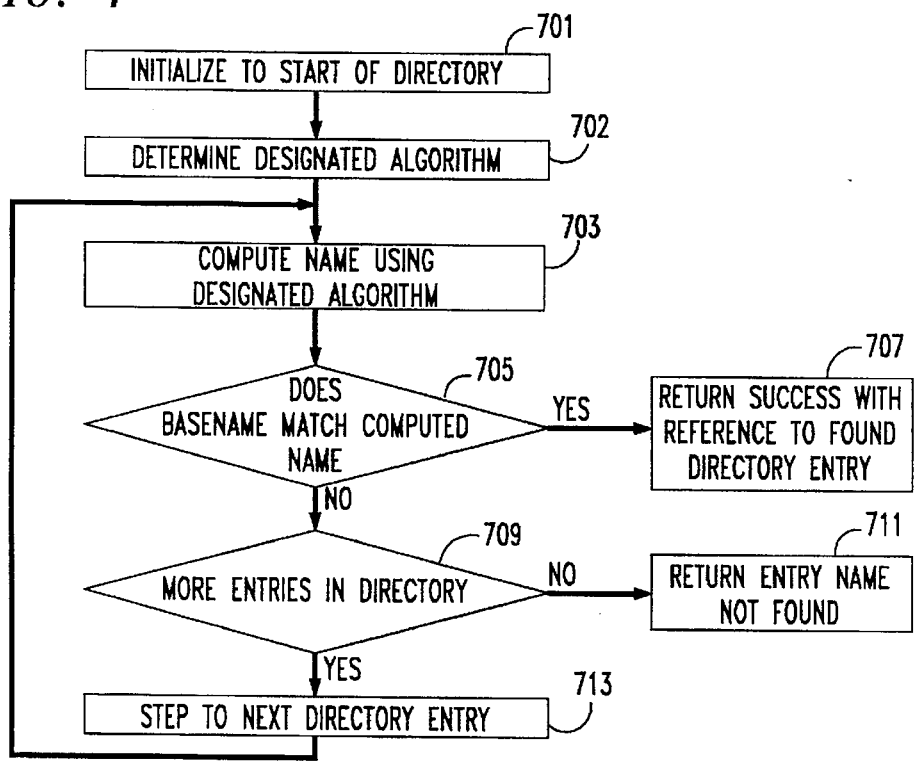
FIG. 7 shows an illustrative flow chart for implementing a second look-up strategy.
Figure 8:
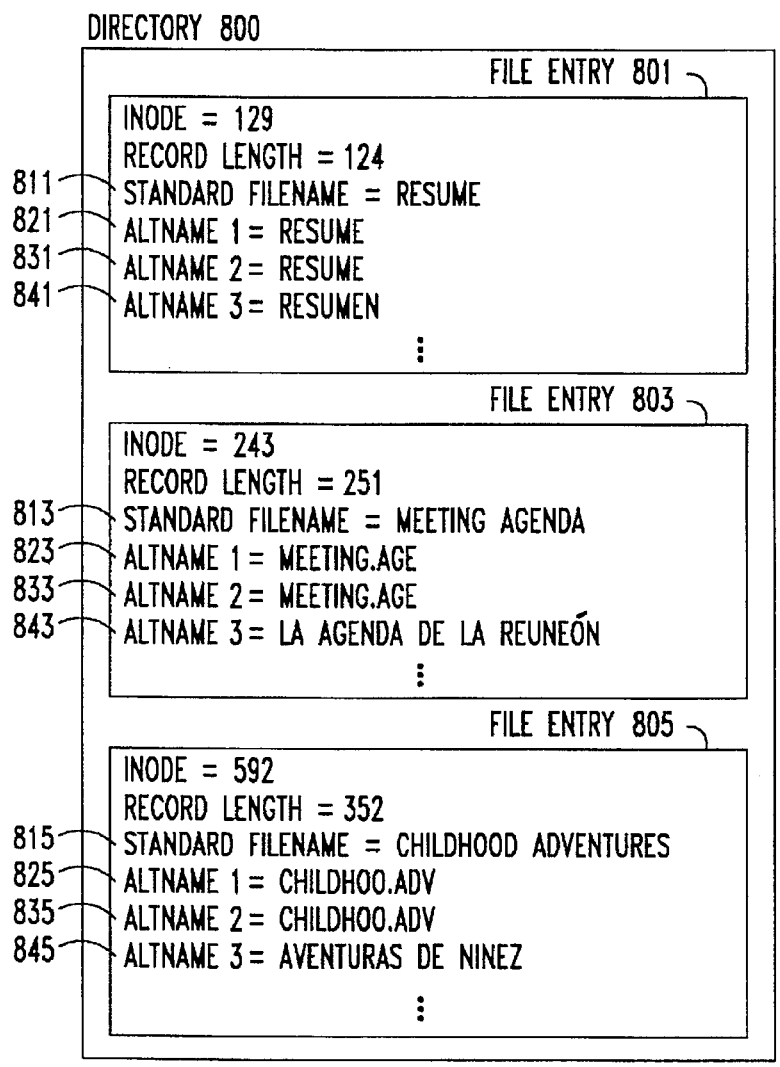
FIG. 8 illustrates a logical structure of a directory using aliases or alternate names.

On file systems using this invention, alias forms of the non-restrictive file name may be stored in the file system itself (e.g., directory 800 of FIG. 8). Alternatively, these aliases could be generated "on-the-fly" by having the system compute alternate names (for example, using an MS-DOS-based predetermined file name mapping algorithm, as shown in FIG. 7) from the stored file names (in directory 800 of FIG. 8). When an MS-DOS user requests a list of directory file entries, the server 123 enumerates the directory entries in the file "dos=," the system returns the MS-DOS aliases for all files in the current working directory, subject to the security and administrative controls of the computers. Alternately, these MS-DOS aliases could be enumerated using a well-known file-system-specific system call, such as ioctl().

After the MS-DOS user receives the list of MS-DOS file name aliases, he/she or it (if a programatic user) then selects the desired file name alias and enters a file call using that file name alias or alternate name (e.g., "meeting.age" as shown by 191 of FIG. 1). The file server application program (123 of FIG. 1), knowing that the client computer is running the MS-DOS operating system, would then prepend segment "dos=", thus producing the file name "dos=meeting.age" (192 of FIG. 1) which is passed to the file system driver 132.

If no prepended segments were included in the file name, then the file system compares the base name with the file names stored in the directory (811, 813 and 815 in FIG. 8). If the prepended segment is "dos=" and the MS-DOS aliases are stored by the file system as Alternate Name 1, then the file system will compare the base name with the altname1 values stored in the directory (821, 823, and 825 in FIG. 8). If the prepended segment is "spanish=" and the Spanish language file name translations are stored as Alternate Name 3, then the system will compare the base name with altname3 values stored in the directory (841, 843 and 845 in FIG. 8).

If the prepended segment selects a file name alias that is computed "on-the-fly", then the file system will attempt to match the purported base name via the selected file name alias mapping algorithm (FIG. 7).

DETAILED DESCRIPTION

With reference to the layer diagram of FIG. 1 we now provide a more detailed operating description of the present invention.

Figure 4:
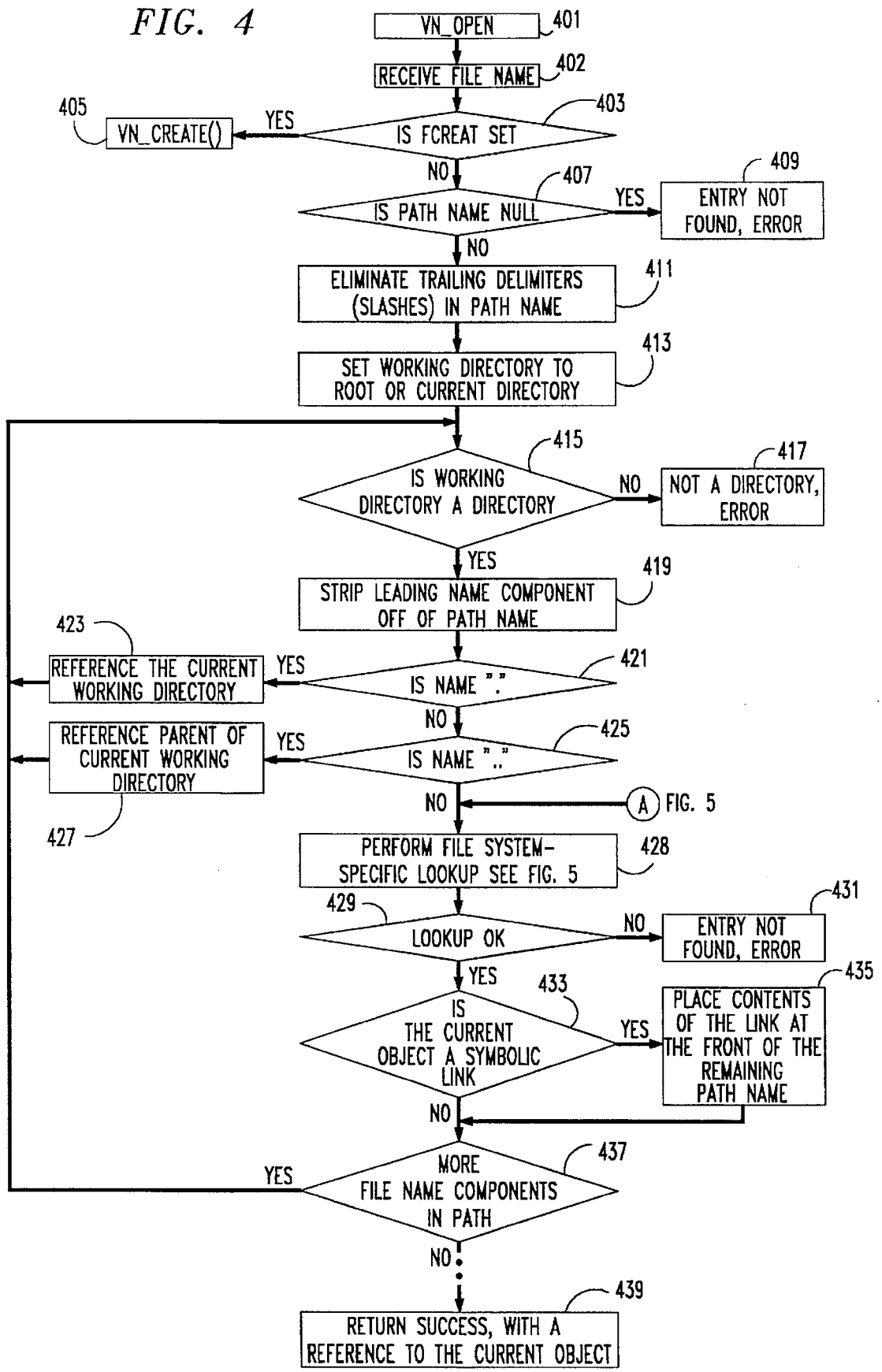
FIGS. 4 and 5 illustrate a flow chart describing various operating features of the present invention.

With joint reference to FIGS. 1 and 4 we describe the detailed operation of the present invention. The present invention is implemented to perform a file system-specific lookup feature as part of the standard lookup path name feature which occurs during a conversion of a path name to a vnode.

The initial access to a file is by its path name, as in the open, chdir (change directory), or link system calls. Because the kernel 130 works internally with vnodes rather than with path names, it converts the path names to vnodes to access files. An algorithm of the UNIX system kernel parses the path name one component at a time, converting each component into a vnode based on its name and the directory being searched, and eventually returns the vnode of the input path name.

The steps 401–425 and steps 429–439 illustrate the existing steps of the path name to vnode conversion which are briefly described so that the detailed operation of the present invention (FIG. 5) can be explained in a typical operating context.

In response to a user search request or other system request, user program 121 makes a system call (e.g., open a file). When a user program 121 makes a system call, e.g., open (path name, open flag), the operating system kernel (hereinafter kernel) 130 generates the well-known command vn_open(name, seg, file mode, create mode, vpp, crwhy) in step 401. The command vn_open performs permission checks and opens a file by name, returning a pointer to the resulting vnode. In the command vn_open the parameter name contains the path name; seg is the address space the file name is in, either user space or kernel space; file mode is the open mode; create mode contains the permission bits if the file is to be created; vpp is a pointer to a vnode pointer for the result; and crwhy is the reason why this routine is called; it is defined if and only if file mode has the Fcreate bit set.

In step 402, a file name is received from a user program 121. In step 403, the kernel 130 checks if the Fcreate bit is set. If so, then in step 405 a command vn_create( ) is generated in the conventional manner. The command of vn_create indicates to the kernel 130 that the process call wishes to create a new file, an operation which is well-known and not important to an understanding of the present invention.

If the Fcreate bit is not set then, in step 407, the path name is checked to determine if it is not null. In our example, recall the path name is "/home/jqp/meeting agenda". (Note, in our DOS system call example, the path name would be "home/jqp/dos=meeting.age"). If path name is null then in step 409 an "entry not found" error is returned to the user program 121.

If path name is not null then, in step 411, the trailing path delimiters (slashes) in the path name are eliminated. (Note our example has no trailing slashes after "meeting agenda"). If, in step 413, the first character of 'name' is a "/" character (indicating a path name starting at root), then the working directory is set to root, otherwise the working directory is set to the current working directory. In step 415, it is determined whether the working directory is actually a directory. If not, then in step 417 a "not a directory" error is returned to the user program 121. If working directory is a directory then, in step 419, the leading file name component (i.e., "home" in our example) is stripped off the path name.

In step 421, the stripped off file name component "home" is compared to ".". If equivalent, then in step 423 the system will reference the current working directory and then control returns to step 415. If file name component is not "." then in step 425 it is compared to "..". If equivalent to ".." then in step 427 the parent of the current working directory is referenced and control returns to step 415. Otherwise, step 428, the file system-specific look-up feature of the present invention, as illustrated in FIG. 5, is performed on the stripped-off file name "home".

Figure 5:
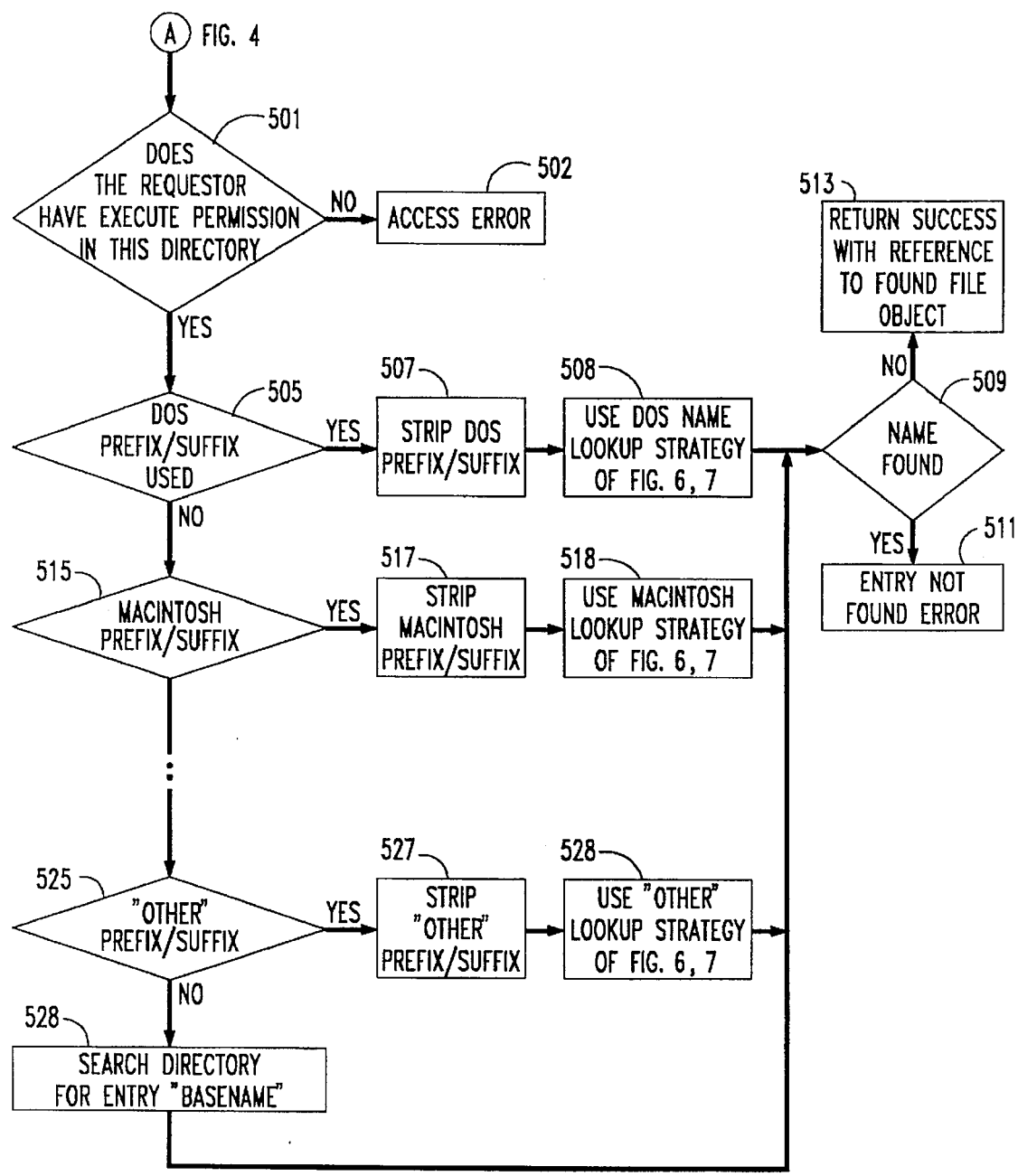

Hence, after the steps of FIG. 5 are performed on the file name "home" it returns to step 429 with a vnode reference to access the file object of the file "home". If no vnode reference was found then an error is returned to the user program 121 in step 431. Otherwise, in step 433, the system checks if the vnode reference refers to a data object which is a symbolic link. If so, then in step 435, the contents of the link are placed at the front of the remaining path name. Otherwise, in step 437 the system determines whether there are more file name components in the path name. If there are no more file name components then, in step 439, control is returned with a vnode reference to the data object. If more file name components exist, then control is returned to step 415 for further processing.

With reference to FIG. 5 we now describe the present invention, as illustratively embodied, as a file system-specific lookup feature. We describe the processing of the file name "home" of our example path name "/home/jqp/meeting agenda". In step 501 the requester's execute permission in the current directory is checked in the standard way. If permission does not exist, an access error message is returned to the user in step 502. If permission does exist, then in step 505, 515 and 525 the file system checks if any prefix or suffix was used. Since no prefix or suffix exists for file name "home", processing continues to 528 which searches the current directory for entry "home." Step 509 checks that an entry was found, and success is returned in step 513. The processing of both "jqp" and "meeting agenda" in the path name is similar to the processing of "home" and hence will not be described.

Figure 6:
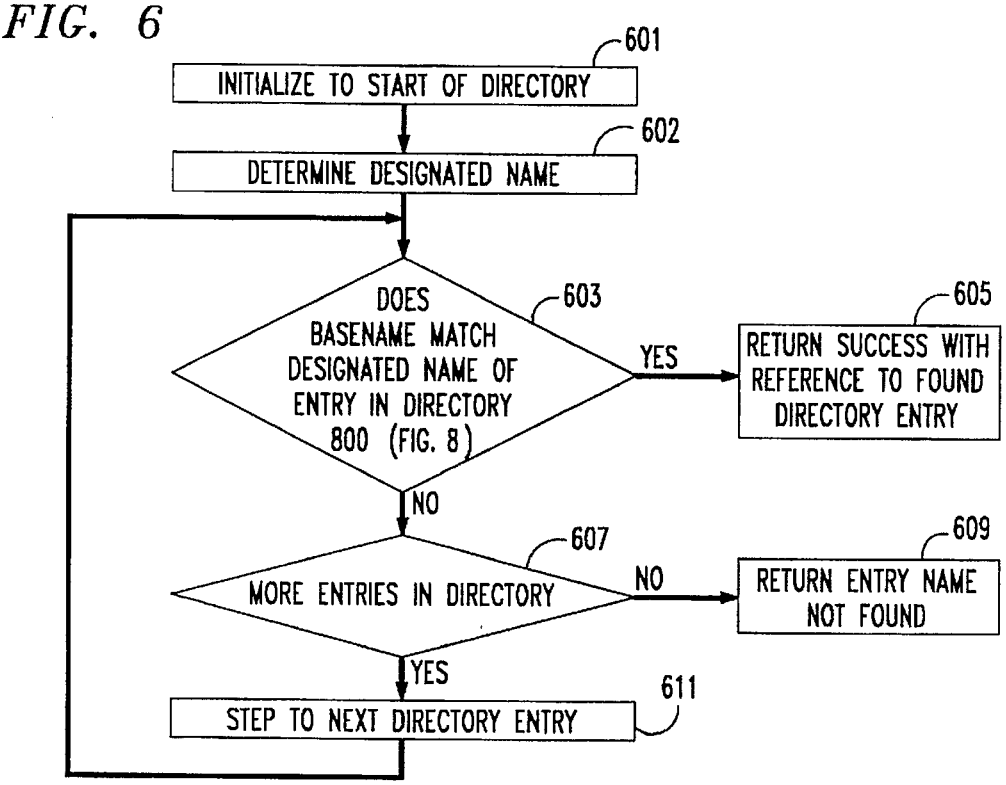
FIG. 6 shows an illustrative flow chart for implementing one look-up strategy.

If permission does exist then, in step 505, the server determines if an MS-DOS prefix/suffix is used. In our example, we assume the client computer user entered "base name" and the server application program 123 added the prefix "dos=" and submitted "dos=base name" to the kernel 130. Then, in step 507, the DOS prefix/suffix is stripped from the file name. Thereafter, in step 508, the DOS name lookup strategy of FIG. 6 or FIG. 7 is used (discussed in later paragraphs). In step 509 it is determined if a matching name has been found. If it has been found then, in step 513, the server returns a success indication with a reference to the found file name. If the DOS file name was not found in step 511 a file name not found error is returned to the client.

In step 505, if it's determined that a DOS prefix/suffix was not used then, in step 515, it is determined if a MACINTOSH prefix/suffix has been used. If the answer is yes then, in step 517, the MACINTOSH prefix/suffix is stripped from the file name. Thereafter, in step 518, the MACINTOSH lookup strategy is used in FIG. 6 or FIG. 7 (discussed in later paragraphs). Thereafter step 509 is performed as previously described.

If a MACINTOSH prefix/suffix was not used in step 515, then other operating system prefix/suffixes are tested, in steps 525, 526 and 527 in a manner as previously described for the DOS and MACINTOSH-type operating systems.

Prefix/suffix systems can be used to represent name spaces other than those defined by computer operating systems. For example, the "other prefix/suffix" of 525 could be "sp=" indicating that the base name is a Spanish translation of the English file name. Typically, file server application program 123, being configured for a Spanish user, may add the "sp=" prefix/suffix so that the client computer user could name files in Spanish. Thus for example, when a user requests the Spanish file name "la agenda de la reuneon" the server would identify it as the alternate name 843 of standard file name "meeting agenda" (813) in working directory 800 of FIG. 8. In working directory 800, other Spanish file name equivalents (e.g., 841 and 845) are shown for the standard file names (e.g., 811 and 815).

The following paragraphs make reference to FIGS. 6 and 8. FIG. 6 illustrates a flow diagram used to implement a lookup strategy which, illustratively, utilizes alternate DOS file names to locate UNIX files in directory 800 of FIG. 8. In the following example, we assume that the DOS file name is stored in alternate-named locations of a file entry, shown in FIG. 8 as altname1 (i.e., 821, 823 and 825). In step 601, the program is initialized to begin at the first entry 801 of directory 800. In step 602, the system uses the prefix/suffix (e.g., "dos=") information to determine which designated name type (file name, altname1, altname2—no difference in this example) is to be checked in each of the file entries 801–805. In step 603, it is determined whether the base name matches the value of the designated name type listed in the first file entry 801 of directory 800. If it does, in step 605 an indication of success with reference to the found directory entry is returned to the user program 121. If the base name does not match the designated name type in the first entry then, in step 607, it is determined if there are more entries in the directory to be checked. If there are then, in step 611, the program steps to the next directory entry (i.e., file entry 803) and control is returned to step 603. If, in step 607, it is determined that there are no more entries in directory 800 then, in step 609, an entry name not found error is returned to the user program 121.

The program illustrated by the flow chart in FIG. 6 describes the procedure whereby the base name is checked against the previously-determined alternate DOS file name of each entry 801 through 805 of directory 800. Thus, for example, if the DOS base name stored as altname1 by the file system and was "meeting.age" then the entry 803 would have been identified and returned to the user program 121.

With reference to FIGS. 7 and 8, we describe a lookup strategy which uses a predetermined algorithm (file name mapping function) to determine the DOS base name equivalents of the UNIX file names 812, 814 and 816 of directory 800.

Figure 9:
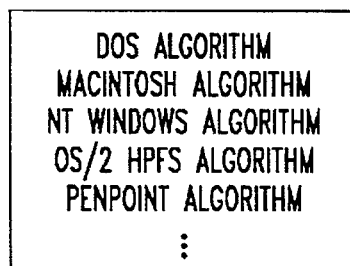
FIG. 9 illustrates a list of typical algorithms for computing file names.

FIG. 9 illustrates a list of typical algorithms that might be used to map the default (standard) file names (e.g., 811, 813, 815) to the selected alternate name type.

One might implement "format-dependent matching" algorithms for each type of client operating system that a file server supports. These format-dependent matching algorithms would enable "on-the-fly" conversions of 1) the format of a base name received in a user program request to the format of the standard file name or 2) the format of the standard file name to the format of a base name received in a user program request. FIG. 9 enumerates the format-dependent matching algorithms for some of the important client operating systems that one might support, such as DOS, MACINTOSH, OS/2's high performance file system, PENPOINT operating system (PENPOINT is a trademark of GO Corporation), NT Windows operating system (NT Windows is a registered trademark of Microsoft Corporation).

In step 701 the program is initialized to the first entry of directory 800. In step 702, the system uses the prefix/suffix information to designate which predetermined algorithm should be used to compute the alternate filename. Those alternate algorithms are listed in FIG. 9. In our example, the DOS algorithm is selected because of the prefix "dos=". In step 703 the computed alternate file name is calculated using the DOS algorithm. For example, one such predetermined algorithm may specify that all spaces in file names are to be eliminated and that the first eleven characters are to be arranged in an 8.3 DOS format. In step 705, the program determines whether the base name matches the computed alternate file name for the file name 811 of the first entry 801 in directory 800. If it does then, in step 707, success is returned to the user program 121 with a reference to the found entry in directory 800. Otherwise, in step 709, it is determined if there are more entries in directory 800. If there are not more entries then, in step 711, the user program 121 receives an "entry name not found" message. If more entries exist then, in step 713, the program advances to the file name (i.e., 813) of next entry 803 and control is returned to step 703. The process steps 703, 705, 709 and 713 are performed sequentially for all the entries of directory 800 until either the base name is found, step 707, or the base name is not found, step 711. Alternately, the algorithm can be applied to the purported base name (thereby replacing step 703) and that computed name can be compared to the stored file name (thereby replacing step 705).

If, for example, the UNIX file name (e.g., 813) was "meeting agenda" then, using the previously described algorithm (eliminate blank spaces, then coerce into 8.3 format) the system would compute the DOS-equivalent file name "meetinga.gen". This computed MS-DOS file name equivalence of file name 813 of directory 800 would then be compared against the base name of the user program-entered file access command (dos=base name).

With joint reference to FIGS. 3, 5–8 we now review how a DOS client can access previously created UNIX files which are named "resume", "meeting agenda" and "childhood adventures". To first determine which files are present in a directory, a DOS client may perform a command to enumerate all files within a directory. This list command outputs all DOS file names in directory 800. In the directory example shown in FIG. 8, the server would know that the client is utilizing a DOS machine and, consequently, would output only the DOS alternate names shown in entries 821, 823 and 825 which are associated with the UNIX file names 811, 813 and 815, that is, "resume", "meeting agenda" and "childhood adventures", respectively. Alternatively, if the previously-specified algorithm was utilized, the server could generate a computed alternative file name equivalent of the UNIX file names 811, 813 and 815. For example, using the previously-specified algorithm "eliminate spaces, then take first 11 characters in DOS 8.3 form" would produce the DOS file names "resume", meetinga.gen" and "childhoo.dad" for the UNIX file names "resume" "meeting agenda" and "childhood adventures", respectively. Obviously, if the computed file names were already stored as altname1 831, 833 and 835 in entries 801, 803 and 805, respectively, of directory 800, the server could merely output this list of file names directly to the client. It should be understood that the algorithm used with each type of operating system, shown in table 850, may be the same or different. If different, then as previously described, the system selects the proper algorithm using the information from the appended segment to the base name.

By first obtaining a list of alternate file names of directory 800, or the computed file names, the client computer user can select and then access the desired file. The server, knowing that the client was at a DOS machine, would append the prefix "dos=" to the base name "childhoo.adv" to form the file name "dos=childhoo.adv". Then in step 505 of FIG. 5, the file system driver would know to strip the "dos=" prefix from the file name to produce a base name which is used to search all of the alternate file names in directory 800. (Note, if the system uses the computed alternate file name technique then the procedure, as previously described in FIG. 7, would be followed). Using the base name "childhoo.adv", the server would locate the alternate name 815 and file entry 805 as the file desired by the client. Since entry 805 has the UNIX file name "childhood adventures" the proper file has been reached by the client.

While the present invention has been described as using a prefix-appended segment (e.g., "dos=" is the prefix to the base name) it is to be understood that a suffix-appended segment (e.g., "@dos" is the suffix of the base name) or combination prefix/suffix-appended segments could be utilized. More generally in response to a client computer user input, a user program may specify via a system call or other mechanism the file name format for subsequent purported file names entered by the user. Thus, for example, such a system call may identify the filename format to be utilized on all file name accesses by the user during a predefined period of time (e.g., a session) or until the user re-specifies the original, or another, format again. Such an arrangement enables the user to change the format on a session basis rather than on an individual file name access basis.

An application or file-system specific system call (e.g., ioctl) can be built that translates file names from one name space to another. For instance, such a mechanism may accept a UNIX file name as input, and return the mapped MS-DOS file name. Such a mechanism is a straightforward application of the principles of this invention.

What has been described is merely illustrative of the application of the principles of the present invention. Other arrangements and methods can be implemented by those skilled in the art without departing from the spirit and scope of the present invention.

I claim:

1. A computer-based file apparatus for accessing any of a plurality of previously-stored data files, the apparatus comprising means for storing data files, each file identified by at least two file names formatted using different file name formats;

means for receiving a user request identifying a file name format utilized by said apparatus for a purported file name entered by a user, wherein said user request includes a purported file name having one or more appended segments and a base name, at least one of said appended segments being used to identify the file name format of said base name, said base name being used to locate a data file having a matching file name; and means for accessing said storing means and checking file names therein which utilize said identified file name format, to locate a data file having a file name which matches said purported file name.

2. The apparatus of claim 1 wherein said at least two file names include a default file name and at least one alternate file name.

3. The apparatus of claim 1 wherein a first file name is formatted utilizing a format associated with a first computer operating system and a second file name is derived from said first file name by using a format associated with a second computer operating system.

4. The apparatus of claim 3 wherein said first and second file names utilize different formats, each format associated with a different computer operating system selected from a group including UNIX, MACINTOSH, NT WINDOWS, OS/2, PENPOINT, and MS-DOS operating systems.

5. The apparatus of claim 3 wherein the range of file names using said second computer operating system format is more restrictive than the range of file names using said first computer system format.

6. The apparatus of claim 1 wherein said accessing means uses said appended segment to determine which of said at least two file names is to be checked to locate a file name which matches said base name.

7. The apparatus of claim 1 wherein at least one of said appended segments is a prefix segment.

8. The apparatus of claim 1 wherein at least one of said appended segments is a suffix segment.

9. The apparatus of claim 1 comprising two appended segments including a prefix and a suffix of said base name.

10. The apparatus of claim 1 wherein said appended segment identifies a computer operating system.

11. The apparatus of claim 1 wherein at least one file is identified by first and second file names, said second file name being formatted from said first file name by using a predetermined algorithm.

12. The apparatus of claim 1 wherein at least one file is identified by a first file name formatted using a first language and a second file name is formatted using a second language.

13. The apparatus of claim 1 wherein said file name format identified in said user request is effective during a predefined session of user activity on said apparatus.

14. A computer-based file apparatus for accessing any of a plurality of previously-stored data files, the apparatus comprising means for storing data files identified using file names formatted using a first format, means for receiving a user request including a purported file name having one or more appended segments and a base name, at least one of said appended segments identifying a second format of said base name, and means, utilizing a format-dependent matching algorithm associated with said second format, for matching said base name to one of said stored data files and for accessing said matched one of said stored data files.

15. The apparatus of claim 14 wherein said matching means includes means for formatting the base name using said first format, and means for accessing said storing means to identify a stored file name which matches said base name formatted using said first format.

16. The apparatus of claim 14 wherein said matching means includes means for accessing said storing means to identify a stored file name which, when formatted using said second format, matches said base name.

17. A method of operating a computer-based file apparatus to access any of a plurality of previously-stored data files, the method comprising the steps of storing data files, each file identified by at least two file names formatted using different file name formats;

receiving a user request identifying a file name format to be utilized by said apparatus for a purported file name entered by a user, said user request including a purported file name having one or more appended segments and a base name, at least one of said appended segments being used to identify the file name format of said base name, said base name being used to locate a data file having a matching file name thereto; and accessing said stored data files and checking file names therein which utilize said identified file name format, to locate a data file having a file name which matches said purported file name.

18. The method of claim 17 wherein said at least two file names include first and second file names which utilize different formats, each format associated with a different computer operating system selected from a group including UNIX, MACINTOSH, NT WINDOWS, OS/2, PENPOINT, and MS-DOS operating systems.

19. A method of operating a computer-based file apparatus to access any of a plurality of previously-stored data files, the method comprising the steps of storing data files identified using file names formatted using a first format, receiving a user request including a purported file name having one or more appended segments and a base name, at least one of said appended segments identifying a second format of said base name, and matching, utilizing a format-dependent matching algorithm associated with said second format, said base name to one of said stored data files, and accessing said matched one of said stored data files.

20. The method of claim 19 wherein said matching step includes the steps of formatting the base name using said first format, and accessing said storing means to identify a stored file name which matches said base name formatted using said first format.

21. The method of claim 19 wherein said matching step includes the step of accessing said storing means to identify a stored file name which, when formatted using said second format, matches said base name.

* * * * *